(12) United States Patent  (10) Patent No.: US 7,421,120 B2
Kang  (45) Date of Patent: Sep. 2, 2008

(54) APPARATUS CORRECTING IMAGE BY LUMINANCE HISTOGRAM

(75) Inventor: Ki-min Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 585 days.

(21) Appl. No.: 11/052,044

(22) Filed: Feb. 8, 2005

(65) Prior Publication Data

US 2005/0249409 A1  Nov. 10, 2005

(30) Foreign Application Priority Data

May 4, 2004  (KR) ...................... 10-2004-0031231

(51) Int. Cl.
*G06K 9/00* (2006.01)
(52) U.S. Cl. ...................... 382/167; 382/168; 382/274; 382/192; 382/162; 358/1.9; 358/518; 358/522; 358/523
(58) Field of Classification Search .................. 382/162, 382/167, 168, 172, 190, 274; 348/68, 362, 348/364, 296, 231.99; 358/1.9, 518–523
See application file for complete search history.

(56) References Cited

U.S. PATENT DOCUMENTS

| 5,420,635 | A * | 5/1995 | Konishi et al. ............... 348/362 |
| 5,703,644 | A * | 12/1997 | Mori et al. .................... 348/363 |
| 6,690,424 | B1 * | 2/2004 | Hanagata et al. ............. 348/364 |
| 6,724,418 | B1 * | 4/2004 | Takahashi ..................... 348/65 |
| 2002/0118971 | A1 * | 8/2002 | Takahashi .................... 396/429 |
| 2004/0036781 | A1 * | 2/2004 | Enomoto ............... 348/231.99 |
| 2004/0165091 | A1 * | 8/2004 | Takemura et al. ........... 348/296 |
| 2004/0184673 | A1 * | 9/2004 | Watanabe .................... 382/274 |
| 2005/0225781 | A1 * | 10/2005 | Koizumi ..................... 358/1.9 |
| 2007/0121140 | A1 * | 5/2007 | Yamazoe et al. ............. 358/1.9 |

FOREIGN PATENT DOCUMENTS

| JP | 07-219356 | 8/1995 |
| JP | 11-164190 | 6/1999 |
| JP | 2000-321944 | 11/2000 |
| JP | 2001-228715 | 8/2001 |
| KR | 1998-015067 | 5/1998 |
| KR | 1999-016228 | 3/1999 |
| KR | 1999-018459 | 3/1999 |
| KR | 1999-0051003 | 7/1999 |
| KR | 2003-0097687 | 12/2003 |

\* cited by examiner

*Primary Examiner*—Matthew C. Bella
*Assistant Examiner*—Ali Bayat
(74) *Attorney, Agent, or Firm*—Roylance, Abrams, Berdo & Goodman, LLP

(57) ABSTRACT

An apparatus and method for selectively increasing contrasts of bright and dark regions and automatically determining an appropriate degree of correction such that the image has a corrected luminance that is closer to an estimated optimal average luminance (EOAL) determined from a quantity of light at pickup. The apparatus for correcting the image comprises a real average luminance calculating means for calculating a Real Average Luminance (RAL) of an incoming image from a luminance histogram representing a luminance distribution of pixels of the incoming image, an optimal average luminance estimating means for obtaining a quantity of light using information with respect to a pickup condition of the incoming image and for estimating the EOAL from the quantity of light, and a luminance correcting means for correcting a luminance of pixels of the incoming image based on a luminance difference (ΔL) between the RAL and the EOAL.

18 Claims, 6 Drawing Sheets

FIG. 7 ance histogram. More particularly, the present invention
APPARATUS CORRECTING IMAGE BY LUMINANCE HISTOGRAM

CROSS-REFERENCE TO RELATED APPLICATIONS

This application claims the benefit under 35 U.S.C. §119(a) of Korean Patent Application No. 2004-31231, filed in the Korean Intellectual Property Office on May 4, 2004, the entire contents of which are incorporated herein by reference.

BACKGROUND OF THE INVENTION

1. Field of the Invention

The present invention relates to an apparatus and a method for automatically correcting images by employing a luminance histogram. More particularly, the present invention relates to an apparatus and a method for correcting images by calculating an Estimated Optimal Average Luminance (EOAL) of an incoming image under pickup conditions of the incoming image to determine corrections such that the average luminance of the incoming images have an optimal luminance level.

2. Description of the Related Art

An image is evaluated as good when a luminance distribution has intermediate values in a luminance histogram of an image signal, that is, when a number of pixels having luminance level values of between 100 to 150 are present in a luminance distribution having 256 luminance levels of between 0 to 255. When there are a number of signals relatively having levels of 100 or less, a screen becomes dark and it is difficult to identify an image included in dark regions. When there are a number of signals having levels of 150 or more, the overall screen becomes bright.

Figure 1:
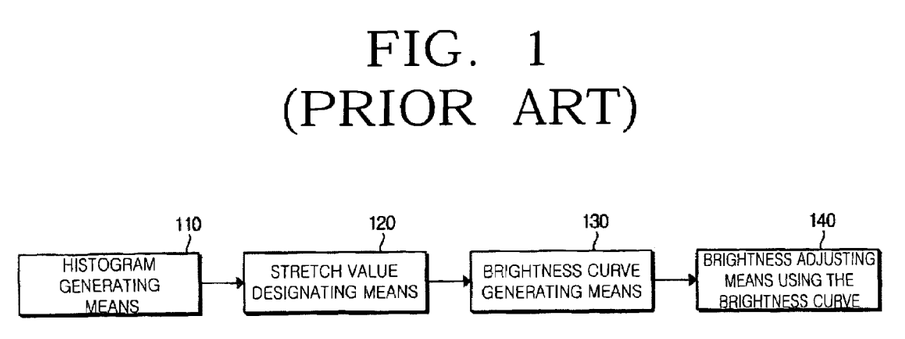
FIG. 1 is a block diagram illustrating an apparatus for correcting images using a conventional brightness curve.

In order to solve such an imbalance of the image, each luminance of pixels is adjusted to correct the incoming image. One of the methods for correcting the incoming image is to use a brightness curve. FIG. 1 is a block diagram illustrating an apparatus for correcting images using a conventional brightness curve.

Referring to FIG. 1, the conventional image correcting apparatus comprises a histogram generating means 110, a stretch value designating means 120, a brightness curve generating means 130, and a luminance adjusting means 140 for using the brightness curve.

Figure 2:
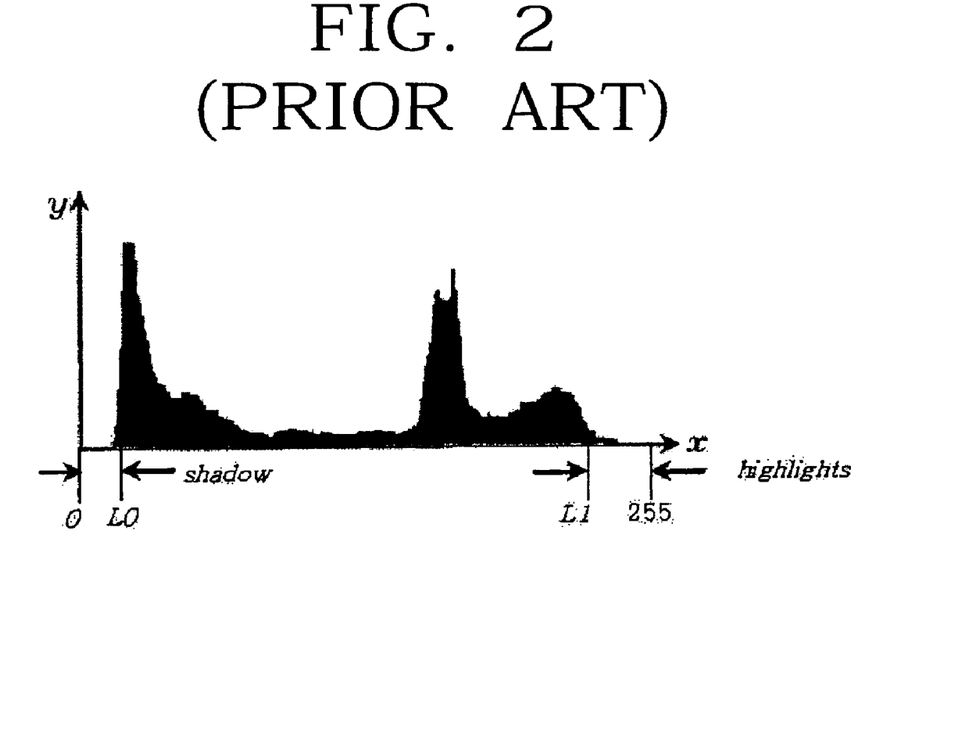
FIG. 2 is a diagram illustrating an example of a histogram.

The histogram generating means 110 generates a luminance histogram of an incoming image. FIG. 2 is a diagram illustrating one example of the histogram. In FIG. 2, the X coordinate indicates a luminance level of the incoming image, wherein the luminance level of the incoming image may be divided into 256 levels of 0 to 255. The Y coordinate indicates the number of pixels (i.e., the number of luminance level frequency).

Returning to FIG. 1, the stretch value designating means 120 receives information about how many degrees that a luminance of the image can be adjusted, that is, information about the luminance stretch value. The stretch value is then used to generate the brightness curve.

Figure 3:
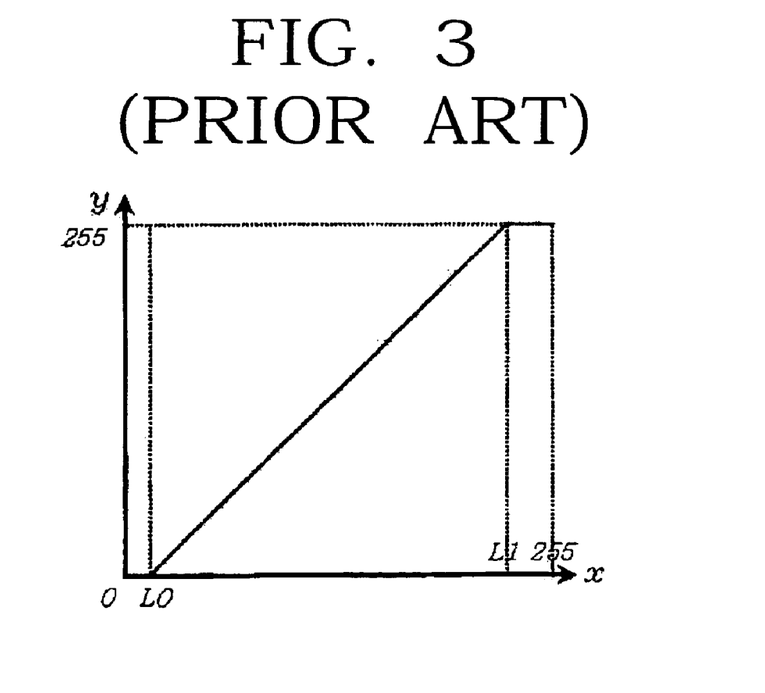
FIG. 3 is a diagram illustrating an example of a conventional brightness curve.

The brightness curve generating means 130 uses the stretch value to generate the brightness curve. When the stretch value is designated, L0 is then determined so as to have the sum of the number of pixels within 0 to L0 to be within the stretch value. For example, when the stretch value is 0.5%, L0 is determined as a minimum value such that the sum of the number of pixels within 0 to L0, when divided by the total number of pixels, is not more than 0.005. The value L1 is then determined as a maximum value such that the sum of the number of pixels within L1 to 255, when divided by the total number of pixels, is also not more than 0.005. Referring to FIG. 2, the values of L0 and L1 are shown when the stretch value is 0.5%. Once the values of L0 and L1 are determined, the brightness curve is generated therefrom. FIG. 3 is a diagram illustrating an example of a conventional brightness curve. Referring to FIG. 3, the X coordinate indicates a luminance level of the incoming image, and the Y coordinate indicates a luminance level of an output image, that is, the corrected image.

The luminance adjusting means 140 uses the brightness curve to correct the image. When the brightness curve is applied to each of the Red (R), Green (G), and Blue (B) channels, brightness and contrast of an image are adjusted. Such a conventional apparatus for correcting the image, however, has a problem in that the luminance, that is, brightness, is uniformly adjusted. Specifically, a method for making bright regions brighter and dark regions darker has been used, which could not reflect the luminance distribution characteristics of the image.

Furthermore, an appropriate degree of correction for the luminance of the image could not be readily determined.

Accordingly, a need exists for a system and method for selectively increasing contrasts of bright and dark regions and automatically determining an appropriate degree of correction for an image.

SUMMARY OF THE INVENTION

It is therefore an object of the present invention to provide an apparatus for correcting images which is capable of increasing a contrast in dark regions when the image includes a number of dark regions, and which is capable of increasing a contrast in bright regions when the image includes a number of bright regions.

It is another object of the present invention to provide an apparatus for automatically determining degrees of appropriate correction for images by obtaining an optimal average luminance using information with respect to pickup conditions of an incoming image, and then correcting the incoming image to make the luminance of the incoming image closer to the optimal average luminance.

According to one aspect of the present invention, an apparatus for correcting images is provided which comprises a real average luminance calculating means for calculating a Real Average Luminance (RAL) of an incoming image from a luminance histogram representing a luminance distribution of pixels of the incoming image, an optimal average luminance estimating means for obtaining a quantity of light using information with respect to a pickup condition of the incoming image when the incoming image is being picked up and for estimating an EOAL from the quantity of light, and a luminance correcting means for correcting a luminance of pixels of the incoming image based on a luminance difference (ΔL) between the RAL and the EOAL.

The real average luminance calculating means may preferably include a histogram generating module for generating a luminance histogram using a luminance distribution of pixels of the incoming image, and a real average luminance calculating module for obtaining an average luminance from the luminance histogram to calculate the RAL.

The luminance histogram may preferably be generated by calculating the luminance from the R, G, and B images of the incoming image.

The optimal average luminance estimating means may preferably include a pickup condition extracting module for extracting information including shutter speed, aperture value, and International Standardization Organization (ISO) speed from among information with respect to the pickup conditions, and an optimal average luminance estimating module for obtaining a quantity of light at pickup using the information extracted from the pickup condition extracting module and for estimating the optimal average luminance from the quantity of light at pickup.

The pickup condition extracting module may preferably extract the shutter speed, aperture value, and ISO speed information by analyzing Exchangeable Image File Format (Exif) 2.2 data when the incoming image is an image picked up by a digital camera supporting the Exif 2.2.

The optimal average luminance estimating module may preferably convert a range of the quantity of light at pickup, that is, Exposure value (Ev), into a range of luminance values of the luminance histogram to estimate the EOAL.

The EOAL value may preferably be obtained by the following Equation (1), and the Ev value may be calculated from the following Equation (2), $$EOAL = Ev*255/21 \quad (1)$$

$$Ev = Av + Tv + Sv \quad (2)$$

wherein $Av = 2 \log_2(F \text{ number})$, $Tv = -2 \log_2(\text{exposure time})$, $Sv = 2 \log_2(\text{ISO}/100)$, and in which, F denotes an aperture value, exposure time denotes a shutter speed, and ISO denotes an ISO speed value.

The luminance correcting means may preferably include a luminance difference calculating module for calculating a luminance difference ($\Delta L$) between the EOAL and the RAL, and a histogram adaptive Piece-Wise curve module for correcting a luminance of the incoming image by means of a curve having at least first to third points of inflection determined using the $\Delta L$.

The first to third points of inflection $P_1$, $P_2$, and $P_3$ may preferably be represented by the following Equations (3), (4) and (5), respectively, $$Y_1 = \Delta L *\% \, s + X_1 \quad (3)$$

$$Y_2 = \Delta L *(1 - \% \, s - \% \, h) + X_2 \quad (4)$$

$$Y_3 = \Delta L *\% \, h + X_3 \quad (5)$$

wherein $X_1$, $X_2$, and $X_3$ are luminance values of the incoming image designated by a user and are X coordinate values of $P_1$, $P_2$, and $P_3$, respectively, and $Y_1$, $Y_2$, and $Y_3$ are luminance values of an output image and are Y coordinate values of $P_1$, $P_2$, and $P_3$, respectively. The % s value is a rate of pixels in which the luminance values of the incoming image are between 0 to $X_1$, and the % h value is a rate of pixels in which the luminance values of the incoming image are between $X_3$ and a maximum luminance value.

The $X_2$ value may preferably be a Real Average Luminance (RAL) value.

The $X_1$ to $X_3$ values may preferably be in a relationship wherein $X_1$ is less than $X_2$, and wherein $X_2$ is less than $X_3$, defined as $X_1 < X_2 < X_3$.

The luminance correcting means may preferably correct the luminance of the incoming image by making it brighter by $\Delta L$ when the EOAL is higher than the RAL, and by making it darker by $\Delta L$ when the EOAL is lower than the RAL, wherein each correction is provided to have the luminance closer to the EOAL.

The luminance correcting means also may preferably divide the histogram of the incoming image into a predetermined number of regions, and distribute the $\Delta L$ to these regions based on a rate of pixels of the divided regions, and wherein a range for correcting the RAL of the incoming image in the divided regions preferably corresponds to the distributed $\Delta L$.

According to other aspect of the present invention, a method for correcting images is provided which comprises generating a luminance histogram representing a luminance distribution of pixels of an incoming image, calculating a RAL of the incoming image from the luminance histogram, obtaining an Ev at pickup using information with respect to pickup conditions of the incoming image, estimating an EOAL using the Ev, calculating a luminance difference ($\Delta L$) between the EOAL and the RAL, and correcting a luminance of pixels of the incoming image by means of a curve having at least first to third points of inflection determined using the $\Delta L$.

Obtaining the Ev may preferably be performed by extracting information including shutter speed, aperture value, and ISO speed information from among information with respect to pickup conditions and using the Equation (2) repeated below. A range of the quantity of light (Ev) at pickup may preferably then be converted into a range of luminance values of the luminance histogram to estimate the EOAL.

$$Ev = Av + Tv + Sv \quad (2)$$

Where in Equation (2), $Av = 2 \log_2(F \text{ number})$, $Tv = -2 \log_2(\text{exposure time})$, $Sv = 2 \log_2(\text{ISO}/100)$, and in which, the exposure time is obtained from the shutter speed, the F number is obtained from the aperture value, and the ISO is obtained from the ISO speed information.

The first to third points of inflection $P_1$, $P_2$, and $P_3$ may preferably be represented by the following Equations (3), (4) and (5), repeated below, $$Y_1 = \Delta L *\% \, s + X_1 \quad (3)$$

$$Y_2 = \Delta L *(1 - \% \, s - \% \, h) + X_2 \quad (4)$$

$$Y_3 = \Delta L *\% \, h + X_3 \quad (5)$$

wherein $X_1$, $X_2$, and $X_3$ are luminance values of the incoming image designated by a user and are X coordinate values of $P_1$, $P_2$, and $P_3$, respectively, and $Y_1$, $Y_2$, and $Y_3$ are luminance values of an output image and are Y coordinate values of $P_1$, $P_2$, and $P_3$, respectively. The % s value is a rate of pixels in which the luminance values of the incoming image are between 0 to $X_1$, and the % h value is a rate of pixels in which the luminance values of the incoming image are between $X_3$ and a maximum luminance value.

BRIEF DESCRIPTION OF THE DRAWINGS

The above aspects and features of the present invention will become more apparent by describing certain embodiments of the present invention with reference to the accompanying drawings, in which.

Throughout the drawings, like reference numerals will be understood to refer to like parts, components and structures.

DETAILED DESCRIPTION OF THE EXEMPLARY EMBODIMENTS

Hereinafter, exemplary embodiments of the present invention will be described in detail with reference to the accompanying illustrative drawings.

Figure 4:
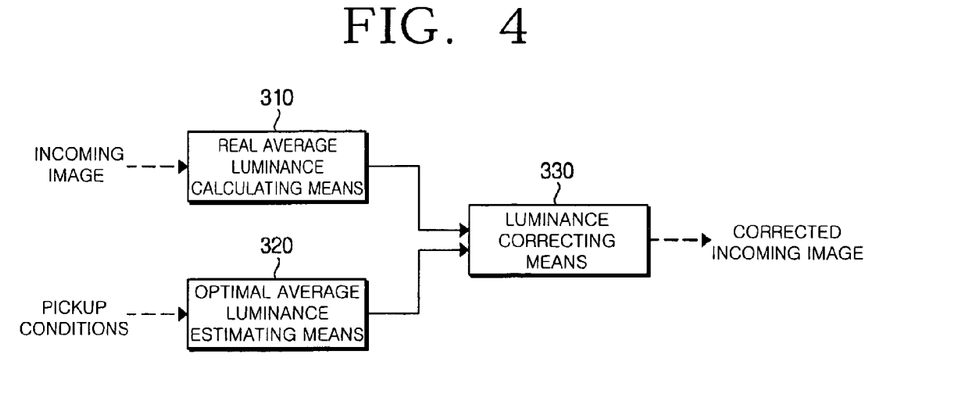
FIG. 4 is a block diagram illustrating an apparatus for correcting images in accordance with an embodiment of the present invention.

FIG. 4 is a block diagram illustrating an apparatus for correcting images in accordance with an embodiment of the present invention.

The apparatus for correcting images in accordance with an embodiment of the present invention comprises a real average luminance calculating means 310, an optimal average luminance estimating means 320, and a luminance correcting means 330.

Figure 5:
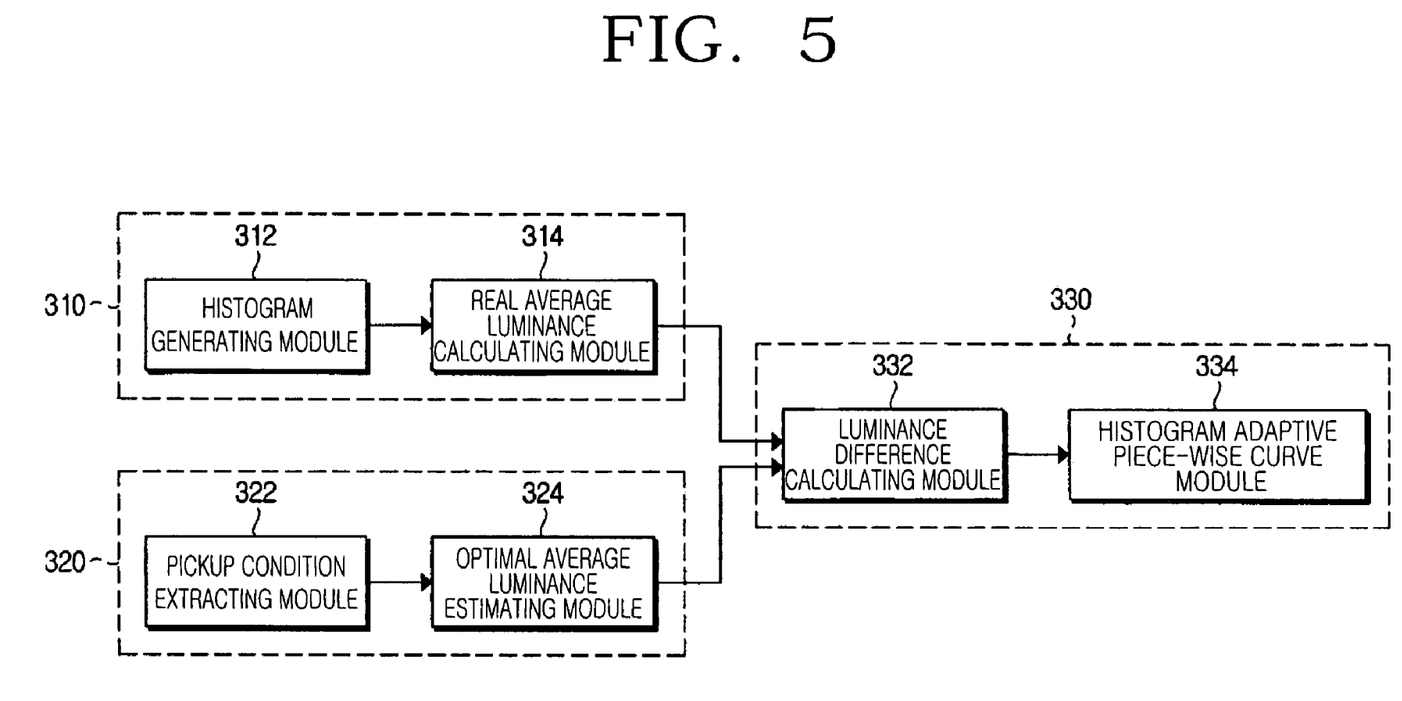
FIG. 5 is a more detailed block diagram illustrating the apparatus for correcting images shown in FIG. 4.

The real average luminance calculating means 310 calculates a histogram from an incoming image, and further calculates a Real Average Luminance (RAL) of the incoming image. FIG. 5 is a more detailed block diagram illustrating the apparatus for correcting images shown in FIG. 4. Referring to FIG. 5, the real average luminance calculating means 310 includes a histogram generating module 312 and a real average luminance calculating module 314.

The histogram generating module 312 generates a luminance histogram for calculating the luminance values of pixels of the incoming image. An Equation (6) for calculating the luminance from the R, G, and B images is as follows.

$$\text{Luminance} = 0.3*R + 0.6*G + 0.1*B \quad (6)$$

Figure 6:
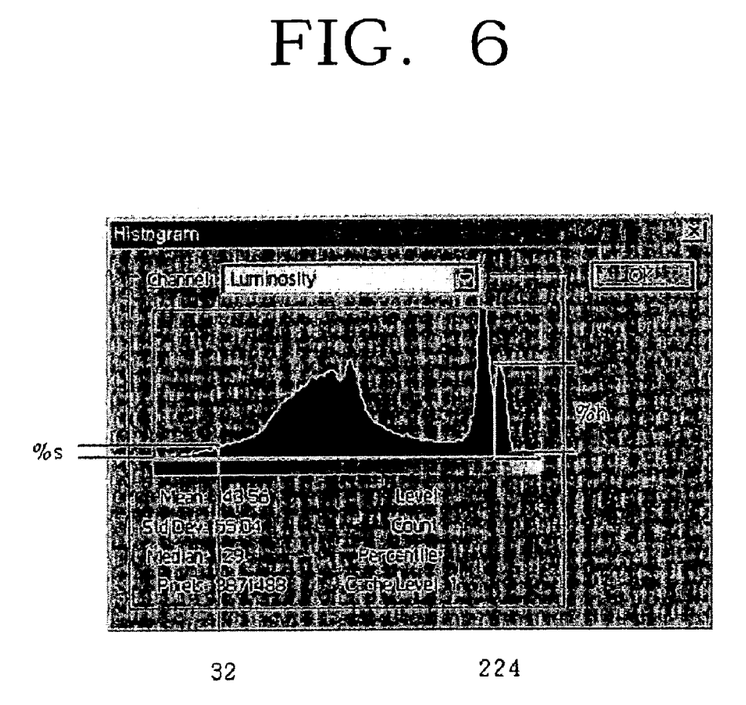
FIG. 6 is a diagram illustrating another example of a histogram.

The real average luminance calculating module 314 calculates a RAL of the incoming image from the luminance histogram. The average luminance represents an average luminance, that is, brightness, of the image, and may be obtained from the luminance histogram. FIG. 6 is a diagram illustrating another example of the histogram. The average luminance of the luminance histogram shown in FIG. 6 is 143.56.

The optimal average luminance estimating means 320 extracts at least a shutter speed, aperture value, and International Standardization Organization (ISO) speed from among the information with respect to pickup conditions, and extracts the EOAL of the incoming image. Referring to FIG. 5, the optimal average luminance estimating means 320 includes a pickup condition extracting module 322, and an optimal average luminance estimating module 324.

The pickup condition extracting module 322 extracts at least the shutter speed, aperture value, and ISO speed from among information with respect to pickup conditions of the incoming image. The pickup condition extracting module 322 analyzes Exif 2.2 data to extract the shutter speed, aperture value, and ISO speed from a header when the incoming image is picked up by a digital camera supporting the Exif 2.2. The Exif 2.2 is a standard file format used for the digital still camera, and has a structure such that information with respect to the pickup conditions of the image is located within the header.

The optimal average luminance estimating module 324 uses the information extracted from the pickup condition extracting module 322 to estimate the optimal average luminance. Hereinafter, estimating the optimal average luminance will be described in greater detail. The shutter speed, aperture value, and ISO speed are used to calculate a quantity of light, that is, Exposure value (Ev) exposed by the camera at pickup, which is defined as an additive system of photographic exposure (APEX) value. The Equation (2) for calculating the Ev is repeated as follows, $$Ev = Av + Tv + Sv \quad (2)$$

wherein $Av = 2 \log_2(\text{F number})$, $Tv = -2 \log_2(\text{exposure time})$, $Sv = 2 \log_2(\text{ISO}/100)$, and in which, the exposure time is obtained from the shutter speed, the F number is obtained from the aperture value, and the ISO is obtained from the ISO speed information.

The optimal average luminance (brightness) may be estimated from the Ev. The Ev is generally represented in a range of about 0 to about 21. The luminance value, however, is represented in a range of about 0 to about 255. Accordingly, the Ev should preferably be converted into the EOAL. This conversion may be represented as Equation (7) shown below, $$\text{EOAL} = F(Ev) \quad (7)$$

wherein the F factor is a function for converting the Ev value into the EOAL. The EOAL is therefore obtained by Equation (1), that is, $$\text{EOAL} = Ev*255/21 \quad (1)$$

when the Ev is represented in a range of about 0 to about 21, and the luminance value is represented in a range of about 0 to about 255.

The luminance correcting means 330 calculates a luminance difference ($\Delta L$) between the EOAL and the RAL of the incoming image, and corrects the luminance of the incoming image by $\Delta L$ to have the average luminance of the corrected incoming image closer to the EOAL. Referring to FIG. 5, the luminance correcting means 330 includes a luminance difference calculating module 332, and a histogram adaptive Piece-Wise curve module 334.

The luminance difference calculating module 332 calculates a luminance difference ($\Delta L$) between the EOAL and the RAL. This may be represented by the following Equation (8).

$$\Delta L (\text{delta } L) = \text{EOAL} - \text{RAL} \quad (8)$$

The incoming image is dark as compared to an exposure value taken by the camera when the $\Delta L$ is a positive value, and is bright as compared to the exposure value taken by the camera when the $\Delta L$ is a negative value. Accordingly, the incoming image is corrected to be brighter by $\Delta L$ when the EOAL is higher than the RAL, and to be darker by $\Delta L$ when the EOAL is lower than the RAL, so that the average luminance of the corrected incoming image is closer to the EOAL.

The histogram adaptive Piece-Wise curve module 334 corrects the luminance of the incoming image by means of a curve having at least three points of inflection, that is, a first point of inflection $(X_1, Y_1)$, a second point of inflection $(X_2, Y_2)$, and a third point of inflection $(X_3, Y_3)$, as determined using $\Delta L$. Coordinates of the points of inflection may be represented by the following Equations (3), (4) and (5), repeated below.

$$Y_1 = \Delta L*\% s + X_1 \quad (3)$$

$$Y_2 = \Delta L*(1 - \% s - \% h) + X_2 \quad (4)$$

$$Y_3 = \Delta L*\% h + X_3 \quad (5)$$

wherein $X_1$, $X_2$, and $X_3$ are luminance values of the incoming image designated by a user, and are in a relation wherein $X_1$ is less than $X_2$, and wherein $X_2$ is less than $X_3$, defined as $X_1 < X_2 < X_3$. The $Y_1$, $Y_2$, and $Y_3$ values are luminance values of an output image, the % s value is a rate of pixels in which luminance values of the incoming image are between 0 to $X_1$, and the % h value is a rate of pixels in which the luminance values of the incoming image are between $X_3$ and a maximum luminance value. The $X_1$, $X_2$, and $X_3$ values may be designated by a selection of the user.

In the Equations (3), (4) and (5), when the $X_2$ value is the RAL value, it denotes that the luminance difference (ΔL) is distributed to a dark region, an average brightness region, and a bright region at the rate of % s, (1−% s−% h), and % h, respectively. In other words, the curve is shaped so as to increase the contrast of the dark region in response to the % s value. When the luminance of the incoming image is corrected using the curve determined from the connected three points of inflection, the correction range of the luminance of the image corresponds to the distributed ΔL. That is, the correction range of the luminance of the image is different from the rate of the number of pixels in the luminance histogram that is divided into the predetermined number of regions.

Figure 7:
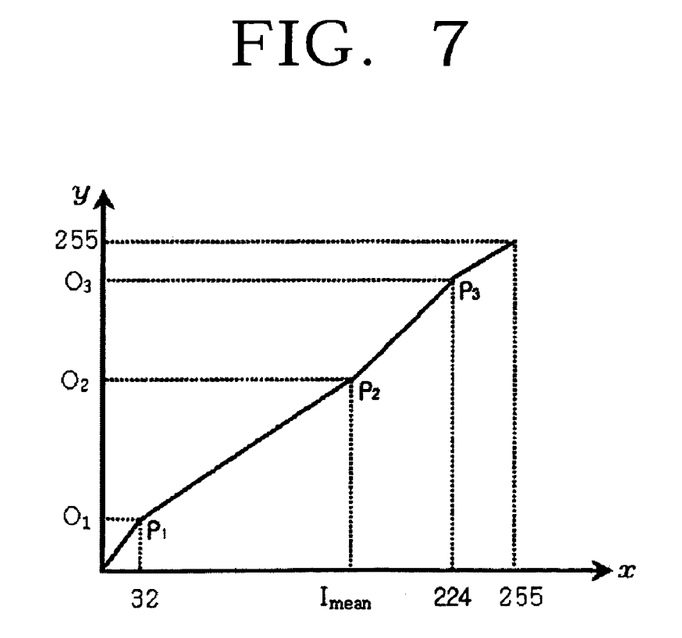
FIG. 7 is a diagram illustrating an example of histogram adaptive Piece-Wise curve.

FIG. 7 is a diagram illustrating an example of a histogram adaptive Piece-Wise curve. Referring to FIG. 7, an X coordinate represents a luminance of the incoming image, and a Y coordinate represents a luminance of an output, that is, a corrected image. Referring to FIG. 7, the first to third points of inflection $P_1$, $P_2$, and $P_3$ are shown where the $X_1$, $X_2$, and $X_3$ values are 32, $I_{mean}$, and 224, respectively. The Y coordinates of the first to third points of inflection are obtained by the following Equations (3), (4) and (5), repeated below.

$$Y_1 = O_1 = \Delta L * \% s + 32 \quad (3)$$

$$Y_2 = O_2 = \Delta L * (1 - \% s - \% h) + I_{mean} \quad (4)$$

$$Y_3 = O_3 = \Delta L * \% h + 224 \quad (5)$$

When the luminance of the incoming image is corrected by the curve shown in FIG. 7, the average luminance of the corrected image becomes closer to the EOAL calculated by pickup conditions.

Figure 8:
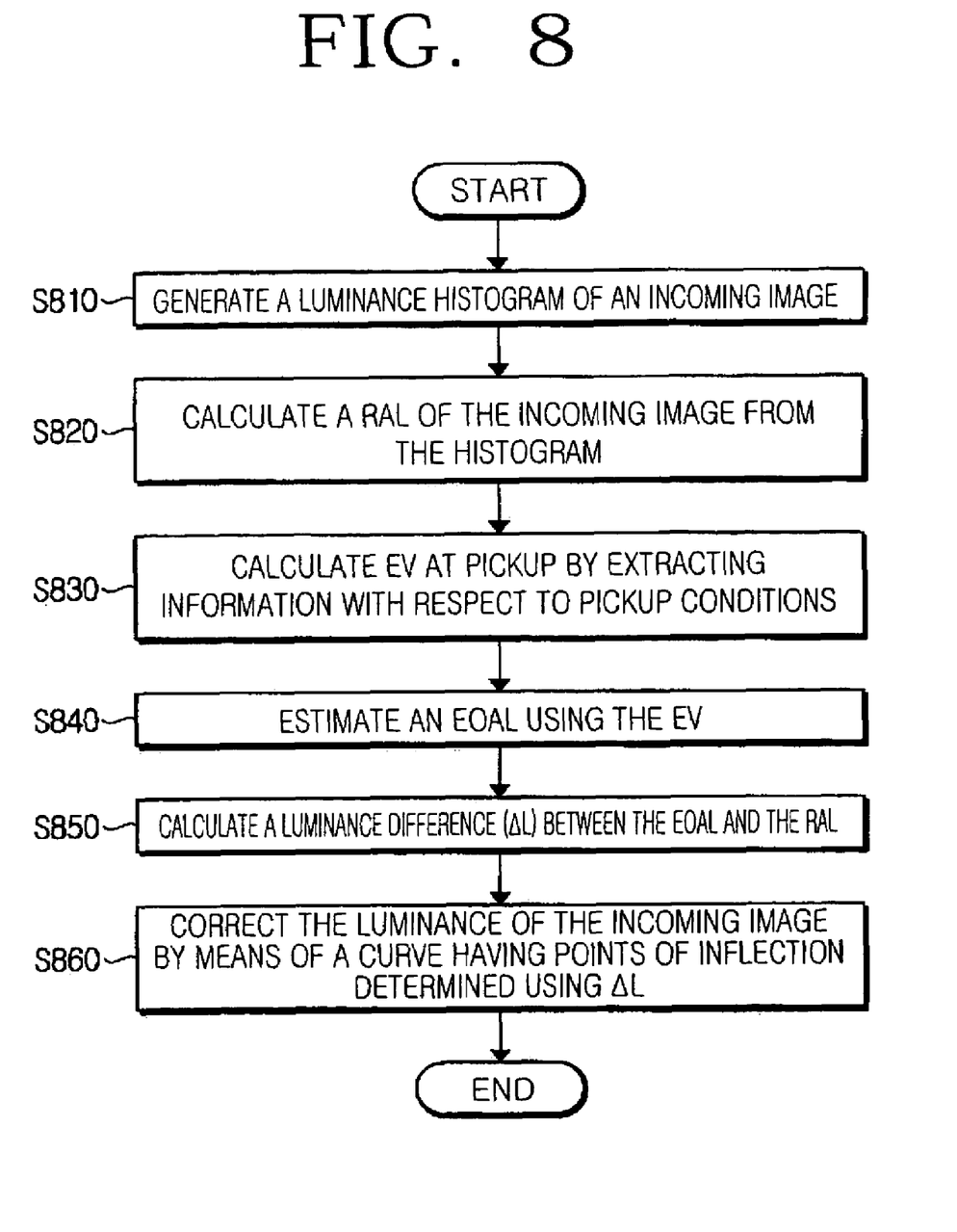
FIG. 8 is a flow chart illustrating a method for correcting images in accordance with an embodiment of the present invention.

FIG. 8 is a diagram illustrating a flow chart of a method for correcting images in accordance with an embodiment of the present invention.

Hereinafter, the method for correcting the image will be described with reference to FIG. 5 and FIG. 8. Descriptions which are substantially similar to those of the apparatus for correcting the image are omitted. A luminance histogram of the incoming image is first generated from the histogram generating module 312 at step S810. In general, the luminance is calculated from the R, G, and B images to generate the luminance histogram.

The real average luminance calculating module 314 then calculates a RAL of the incoming image from the luminance histogram at step S820. The average luminance represents an average brightness of the image.

The pickup condition extracting module 322 extracts the shutter speed, aperture value, and ISO speed information from among pickup conditions of the incoming image. The extracted information is then used to calculate the quantity of light, that is, Ev, exposed by the camera at step S830. An exposure time and an F number are obtained from the shutter speed and the aperture value from among the extracted information, and the Ev exposed by the camera is calculated using the Equation (2).

The optimal average luminance estimating module 324 then uses the Ev value to calculate the EOAL at step S840. Preferably, the range of Ev is converted into a luminance range to calculate the EOAL.

The luminance difference calculating module 332 calculates the luminance difference (ΔL) between the EOAL and the RAL at step S850. The incoming image is then corrected by an amount of ΔL.

The histogram adaptive Piece-Wise curve module 334 corrects the luminance of the incoming image by means of the curve determined from the connected three points of inflection, that is, the first to third points of inflection, using the ΔL at step S860. The points of inflection are calculated by the Equations (3), (4) and (5). Accordingly, the luminance of the image corrected by means of this method becomes closer to the EOAL in response to pickup conditions. In addition, the curve may be set by adjusting the first point of inflection when there exists a number of dark regions, and by adjusting the third point of inflection when there exists a number of bright regions, thereby adaptively correcting the image in response to a distribution of the luminance histogram. Furthermore, the degree of correction is automatically determined by the pickup conditions.

As noted above, in accordance with the present invention, an apparatus for correcting images may be provided by adjusting the positions of points of inflection in response to a luminance distribution of the image shown in a luminance histogram to thereby selectively increase contrasts of bright regions and/or dark regions.

Furthermore, in accordance with the present invention, an apparatus for correcting images may also be provided by obtaining an EOAL using information with respect to pickup conditions of an incoming image and correcting the luminance of the incoming image to be closer to the EOAL, thereby providing an apparatus which is capable of automatically determining an appropriate degree of correction.

In embodiments of the present invention described herein, three points of inflection are described by way of example, however, the number or position of the points of inflection may be changed and calculated using information with respect to other pickup conditions.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An apparatus for correcting images, comprising:
   a real average luminance calculating means for calculating a Real Average Luminance (RAL) of an incoming image from a luminance histogram representing a luminance distribution of pixels of the incoming image;
   an optimal average luminance estimating means for obtaining a quantity of light using information with respect to a pickup condition of the incoming image when the incoming image is being picked up, and for estimating an Estimated Optimal Average Luminance (EOAL) from the quantity of light; and
   a luminance correcting means for correcting a luminance of pixels of the incoming image based on a luminance difference (ΔL) between the RAL and the EOAL.

2. The apparatus as recited in claim 1, wherein the real average luminance calculating means comprises:
   a histogram generating module for generating a luminance histogram using a luminance distribution of pixels of the incoming image; and a real average luminance calculating module for obtaining an average luminance from the luminance histogram to calculate the RAL.

3. The apparatus as recited in claim 1, wherein the luminance histogram is generated by calculating the luminance from Red (R), Green (G), and Blue (B) images of the incoming image.

4. The apparatus as recited in claim 1, wherein the optimal average luminance estimating means comprises:
a pickup condition extracting module for extracting information comprising at least one of a shutter speed, an aperture value, and an International Standardization Organization (ISO) speed from among information with respect to the pickup conditions; and
an optimal average luminance estimating module for obtaining a quantity of light at pickup (Ev) using the information extracted from the pickup condition extracting module, and for estimating the optimal average luminance from the quantity of light at pickup.

5. The apparatus as recited in claim 4, wherein the pickup condition extracting module extracts the shutter speed, the aperture value, and the ISO speed information by analyzing Exchangeable Image File Format (Exif) 2.2 data when the incoming image comprises an image picked up by a digital camera supporting Exif 2.2.

6. The apparatus as recited in claim 4, wherein the optimal average luminance estimating module converts a range of the quantity of light at pickup (Ev) into a range of luminance value of the luminance histogram to estimate the EOAL.

7. The apparatus as recited in claim 6, wherein the Ev value is obtained by the Equation, $$Ev=Av+Tv+Sv$$

wherein $Av=2\ \log_2$(F number), $Tv=-2\ \log_2$(exposure time), $Sv=2\ \log_2$(ISO/100), and in which, F number denotes an aperture value, exposure time denotes a shutter speed, and ISO denotes an ISO speed value.

8. The apparatus as recited in claim 7, wherein the EOAL value is obtained by the Equation, $$EOAL=Ev*255/21.$$

9. The apparatus as recited in claim 1, wherein the luminance correcting means comprises:
a luminance difference calculating module for calculating a luminance difference ($\Delta L$) between the EOAL and the RAL; and
a histogram adaptive Piece-Wise curve module for correcting a luminance of the incoming image by means of a curve having at least first to third points of inflection $P_1$, $P_2$, and $P_3$ determined using the $\Delta L$.

10. The apparatus as recited in claim 9, wherein the first to third points of inflection $P_1$, $P_2$, and $P_3$ are represented by the Equations, respectively, $$Y_1=\Delta L*\%\ s+X_1,$$

$$Y_2=\Delta L*(1-\%\ s-\%\ h)+X_2,$$

$$Y_3=\Delta L*\%\ h+X_3,$$

wherein $X_1$, $X_2$, and $X_3$ are luminance values of the incoming image designated by a user and are X coordinate values of $P_1$, $P_2$, and $P_3$, respectively, and
wherein $Y_1$, $Y_2$, and $Y_3$ are luminance values of an output image and are Y coordinate values of $P_1$, $P_2$, and $P_3$, respectively, and
wherein the % s value is a rate of pixels in which luminance values of the incoming image are between 0 to $X_1$, and wherein the % h value is a rate of pixels in which luminance values of the incoming image are between $X_3$ and a maximum luminance value.

11. The apparatus as recited in claim 10, wherein the $X_2$ value comprises a Real Average Luminance (RAL) value.

12. The apparatus as recited in claim 10, wherein $X_1$ is less than $X_2$, and $X_2$ is less than $X_3$.

13. The apparatus as recited in claim 1, wherein the luminance correcting means corrects the luminance of pixels of the incoming image by making the pixels brighter by $\Delta L$ when the EOAL is higher than the RAL, and by making the pixels darker by $\Delta L$ when the EOAL is lower than the RAL, such that the incoming image has a corrected luminance that is closer to the EOAL.

14. The apparatus as recited in claim 1, wherein the luminance correcting means divides the histogram of the incoming image into a predetermined number of regions and distributes the $\Delta L$ based on a rate of pixels of the divided regions, and wherein a range for correcting the RAL of the incoming image in the divided regions corresponds to the distributed $\Delta L$.

15. A method for correcting images, comprising:
generating a luminance histogram representing a luminance distribution of pixels of an incoming image;
calculating a Real Average Luminance (RAL) of the incoming image from the luminance histogram;
obtaining a quantity of light at pickup (Ev) using information with respect to pickup conditions of the incoming image;
estimating an Estimated Optimal Average Luminance (EOAL) using the Ev;
calculating a luminance difference ($\Delta L$) between the EOAL and the RAL; and
correcting a luminance of pixels of the incoming image by means of a curve having at least first to third points of inflection $P_1$, $P_2$, and $P_3$, determined using the $\Delta L$.

16. The method as recited in claim 15, wherein the step of obtaining the Ev further comprises the steps of:
extracting information including at least one pickup condition comprising a shutter speed, an aperture value, and an ISO speed information; and
obtaining the Ev using the Equation, $$Ev=Av+Tv+Sv$$

wherein $Av=2\ \log_2$(F number), $Tv=-2\ \log_2$(exposure time), $Sv=2\ \log_2$(ISO/100), and in which, the exposure time is obtained from the shutter speed, the F number is obtained from the aperture value, and the ISO is obtained from the ISO speed information.

17. The method as recited in claim 16, wherein the step of estimating the EOAL using the Ev further comprises the step of converting a range of the quantity of light at pickup (Ev) into a range of luminance value of the luminance histogram.

18. The method as recited in claim 15, wherein the first to third points of inflection $P_1$, $P_2$, and $P_3$ are represented by the Equations, respectively, $$Y_1=\Delta L*\%\ s+X_1,$$

$$Y_2=\Delta L*(1-\%\ s-\%\ h)+X_2,$$

$$Y_3=\Delta L*\%\ h+X_3,$$

wherein $X_1$, $X_2$, and $X_3$ are luminance values of the incoming image designated by a user and are X coordinate values of $P_1$, $P_2$, and $P_3$, respectively, and wherein $Y_1$, $Y_2$, and $Y_3$ are luminance values of an output image and are Y coordinate values of $P_1$, $P_2$, and $P_3$, respectively, and wherein the % s value is a rate of pixels in which luminance values of the incoming image are between 0 to $X_1$, and wherein the % h value is a rate of pixels in which luminance values of the incoming image are between $X_3$ and a maximum luminance value.

* * * * *